May 13, 1958    E. G. PICKELS ET AL    2,834,248
APPARATUS AND METHOD FOR ANALYZING REFRACTIVE INDEX
VARIATIONS AND REFRACTIVE INDEX GRADIENTS
Filed May 12, 1955    8 Sheets-Sheet 1

EDWARD G. PICKELS &
FRANK A. PEARSON
INVENTORS

BY

ATTORNEYS

FIG_11

FIG_12

EDWARD G. PICKELS &
FRANK A. PEARSON
INVENTORS

BY

ATTORNEYS

EDWARD G. PICKELS &
FRANK A. PEARSON
INVENTORS

United States Patent Office 2,834,248
Patented May 13, 1958

2,834,248

APPARATUS AND METHOD FOR ANALYZING REFRACTIVE INDEX VARIATIONS AND REFRACTIVE INDEX GRADIENTS

Edward G. Pickels, Atherton, and Frank A. Pearson, Los Altos, Calif., assignors to Beckman Instruments, Inc., Fullerton, Calif., a corporation of California Application May 12, 1955, Serial No. 507,854

8 Claims. (Cl. 88—14)

This invention relates generally to an apparatus and method for analyzing refractive index variations and refractive index gradients in solutions, and more particularly to an apparatus and method for use in electrophoresis and diffusion studies.

In co-pending application Serial No. 386,991, filed October 9, 1953, electrophoresis apparatus has been disclosed which employs a cell having a transparent limb containing the sample to be analyzed. The optical system for indicating the index of refraction includes a light source emitting a light beam, a Schlieren lens for collimating the light which passes through the limb, a mirror disposed adjacent the limb to reflect the radiant energy back through the limb and lens and thence through an appropriate optical system for performing the analysis. The equipment described is adaptable to various types of analysis, as, for example, the "Gouy" fringe method, described in Experimental test of an interference method for the study of diffusion, Journal of the American Chemical Society, vol. 69, page 2510, L. G. Longsworth and The theory of an interference method for the study of diffusion, supra at page 2516, G. Kegeles and L. J. Gosting.

It is a general object of the present invention to provide apparatus of the above character which has an improved optical system.

It is another object of the present invention to provide apparatus of the above character which includes an optical system for accurately calibrating the cell for the "Gouy" fringe method.

It is another object of the present invention to provide improved means for reducing the intensity of the undeviated slit image.

It is a further object of the invention to provide means for imaging "Gouy" interference patterns having substantially unit horizontal magnification.

These and other objects of the invention will appear more clearly from the following description in which the preferred embodiment of the apparatus has been set forth in detail in conjunction with the accompanying drawings.

Referring to the drawings.

Figure 1:
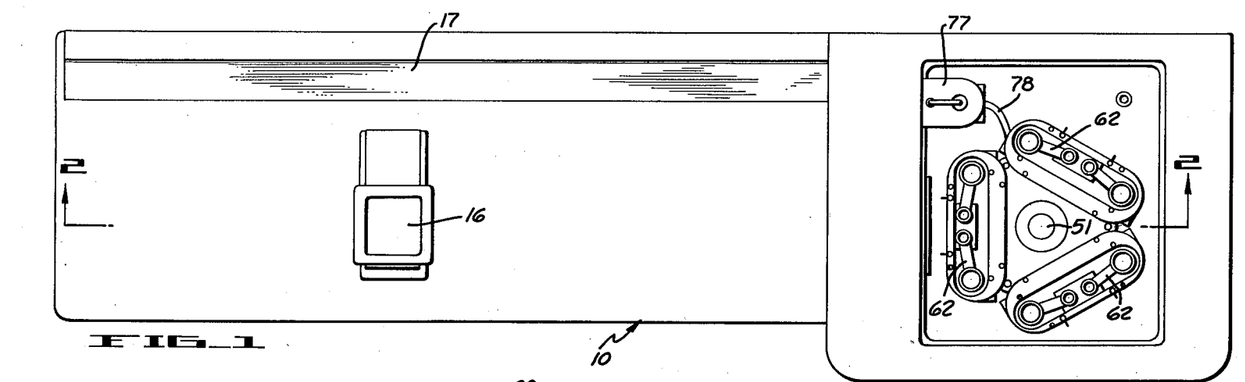
Figure 1 is a plan view showing apparatus in accordance with the present invention.
Figure 2:
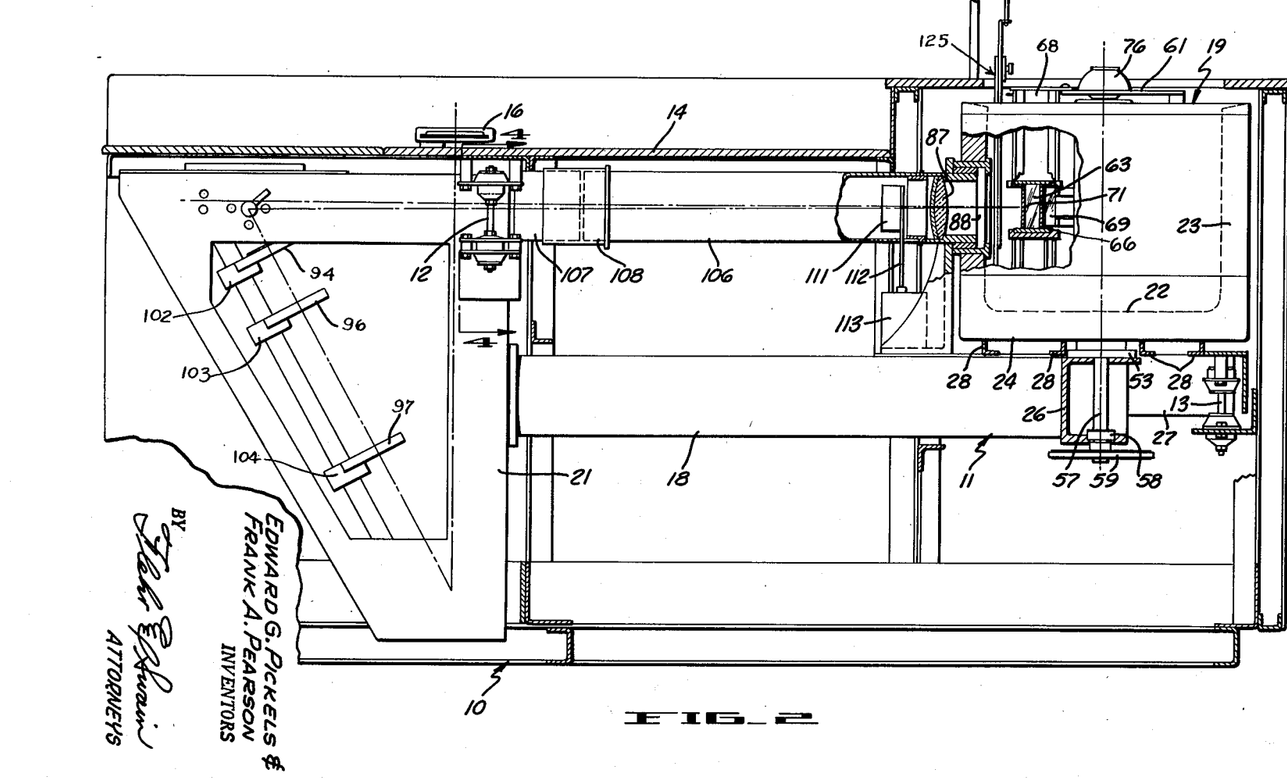
Figure 2 is a side elevational view partly in section taken along the line 2—2 of Figure 1.

Referring to Figures 1 and 2 of the drawings, the apparatus consists generally of a main rigid frame 10 which is fabricated from suitable structural elements and provided with side walls to form an enclosing cabinet. Within the main frame there is a sub-frame 11 which serves to carry the main operating parts of the machine, and which is secured to the main frame by a shock-absorbing means 12 and 13. The top 14 of the cabinet is provided with a holder 16 for a viewing screen or photographic plate. An instrument panel 17 is shown extending upwards from the rear of the cabinet and may serve to mount various instruments and control devices (not shown).

The sub-frame 11, because of its shaping, can be referred to as one of the "banjo" type. It consists of a rigid horizontal strut 18 which can be in the form of a steel pipe, and which is attached at its one end to the structural members forming a mounting for the water tank 19. At its other end, the strut 18 is attached to the housing 21, which forms mounting means for certain of the optical elements.

The water tank 19 consists of a liner 22 formed of non-corrodible material, and a layer 23 of insulating material. The lower part of the tank is enclosed within the external metal shell 24. The strut 18 is attached to the cross member 26, which in turn is attached to the structural member 27 that extends parallel and alongside the strut 18. The framing formed by the structural members serves to mount the tank supporting members 28.

The tank 19 is provided with means for mounting a plurality of cells, whereby these cells can be rotated to successively bring their light transparent limbs into cooperative relationship with the optical system. The particular arrangement illustrated in the drawings includes a vertical post 51 which is hollow and which has a lower end portion of reduced diameter extending through the bottom wall of the tank, and attached by flanged mounting ring 53 to the cross member 26. Leakage between the post and the tank liner 22 is prevented by suitable means. The drive shaft 57 extends upwardly through the post 51, and is journaled at its lower end by suitable means such as the ball bearing assembly 58. A pulley or gear 59 is shown attached to the lower end of the shaft 57, and is connected to suitable motive means (not shown) whereby the shaft 57 can be rotated in one direction or the other with minimum acceleration.

A plate 61 is fixed to the upper end of post 51. The plate 61 serves to carry the sample cells 62. The particular cells illustrated in Figures 1 and 2 are of the modified Tiselius type, and consist of limbs 63 which are formed with transparent walls and which provide vertical passages or columns of predetermined dimensioning. The limbs are formed with two parallel walls 64 (Figure 13) over which front and back plates 66 are placed. These plates extend beyond the walls 64 as indicated at 67. The extension provides a comparable optical path length for a reference channel. The lower ends of the limbs 63 are in communication. The upper ends of the limbs communicate with the solution containing tubes 68 (Figure 2).

Means are provided for mounting a mirror 69 facing each transparent limb 63. Preferably the mounting means is carried by the post 51. The mirrors are of such character that they can be immersed without corrosion or other deterioration. Mounting means are provided whereby the mirrors can be removed without charging any of the elements which serve to position the mirrors, and when the mirrors are re-applied, they are automatically located approximately in proper position for cooperating with the transparent limbs of the cells. The adjustments provided make it possible to fix the mirrors in accurate alignment with the optical system, and in accurate relation with the limbs of the various cells, as these cells are moved into position for observation.

When in use, each of the cells is provided with terminal electrodes which connect with electrical circuit means. The insulating hub or cap 76 at the top of the shaft 51 is provided with a plurality of openings through which leads (not shown) can extend to the electrodes (not shown) which are associated with the several cells. As is well known by those familiar with electrophoresis methods, the electrical circuit is provided with control means whereby current of a predetermined constant value can be applied to the cells containing the samples under observation.

Normally the tank contains sufficient water (or aqueous solution) to substantially completely immerse the cells, and means is provided to maintain the water at a constant temperature, as, for example, about 1° to 2° C. As a part of the cooling and temperature control system, an electrical pump motor unit 77 is mounted within the tank and has its inlet side connected by tubing 78 with the lower portion of the tank. A cooling coil (not shown) formed of suitable metal tubing is arranged above the pump (not shown) and is connected by tubing to an external refrigeration system whereby a refrigerant is continuously circulated through the coil as required. A temperature control element is immersed in the water bath and serves to control the external means provided for supplying refrigerant to the coil. The control serves to maintain the temperature of the water constant.

Figure 3:
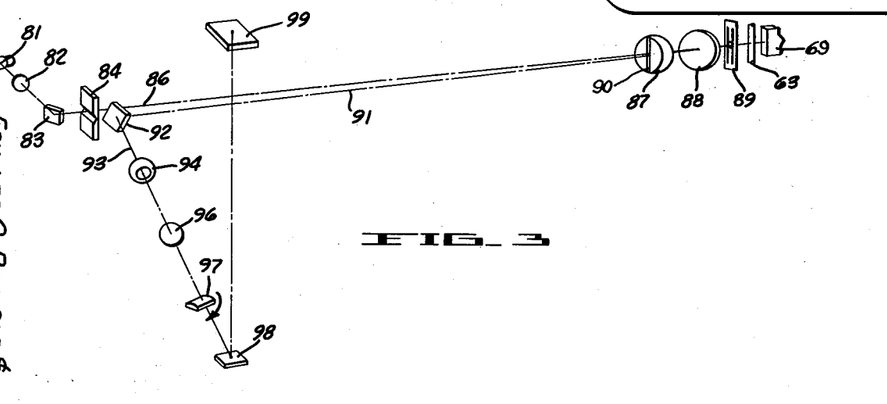
Figure 3 is a schematic view illustrating the optical system employed.

Figure 3 schematically illustrates the optical system which can be employed. The light source employed consists of a lamp 81, the focusing lens 82, and the reflecting mirror 83 which directs the light toward the slit forming device 84. The narrow beam of light emerging from the slit is indicated at 86 and passes through the lens system 87, the tank window 88, past the mask 89 and through the cell limb 63 to be reflected by the mirror 69. The reflected emergent beam 91 is at a slight angle to beam 86 and in a region near the slit 84 there is a mirror 92 which deflects the beam 91 as indicated at 93. An optical system in which auto-collimation is employed is subject to the formation of ghost images. These images may be eliminated by providing a masking strip 90 on the lens 87 which extends parallel to the limbs of the cell and has a width which is dependent upon the spacing between limbs, the spacing off axis of the limbs and the effective focal length of the lens system.

The deflected beam 93 may be projected through several optical devices, including in this instance an analyzer 94, a camera lens 96 and a rotatable cylindrical lens 97. The beam from lens 97 can be reflected by mirror 98 to the photographic plate 99 or viewing screen in holder 16. The lens system 87 functions as a Schlieren lens. The analyzer may include a diagonal slit, wire, bar or like known device for obtaining various Schlieren patterns. The arrangement is such that the light beam 86 is collimated by the Schlieren lens 87 just before it enters the water bath. The collimated light passes through one limb of the electrophoresis cell and is then reflected for passage through the cell near its original path by the cell mirror 69. The reflected light passes through the Schlieren lens 87 which so converges it that it would form an image of the slit in the plane of the slit forming device 84. Just before reaching this image forming position, the light is deflected by the mirror 92.

All of the parts of the optical system are carried by the sub or banjo frame. The illuminating lamp 81, lens 82, mirror 83, slit device 84, mirror 92, analyzer 94, lens 96, lens 97 and mirror 98 are mounted within the rigid housing 18. An inclined bar 101 can be mounted within the casing 18 and can carry certain optical elements. Thus mountings 102, 103 and 104 are shown adjustably clamped on the bar 101 and can serve to carry the analyzer 94, the lens 96 and the cylindrical lens 97.

As shown in Figure 2, the light beam is projected through a tube which serves to prevent thermal variations which would cause fringe displacement or movement. Thus a light metal conduit 106 can be provided, one side of which can be coupled to the hood 107 by the slidable sleeve 108. The other end of the conduit is loosely attached to the lens 87. The means for this purpose can include a light mask (not shown). A light intercepting flag 111 is in front of the lens and can be positioned to intercept energy from either one of the two limbs of the cell. This flag is shown mounted on the vertical rod 112. The rod connects with the electrical motive means 113 whereby, by means of suitable control circuits, the flag can be positioned in either one of two light-intercepting positions.

Figure 4:
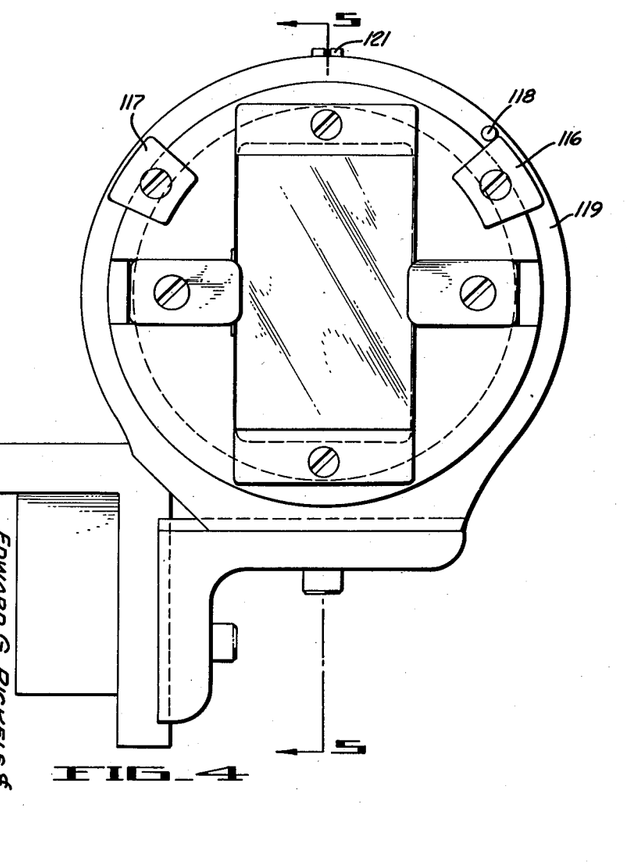
Figure 4 is a front elevational view of the cylindrical lens mount.
Figure 5:
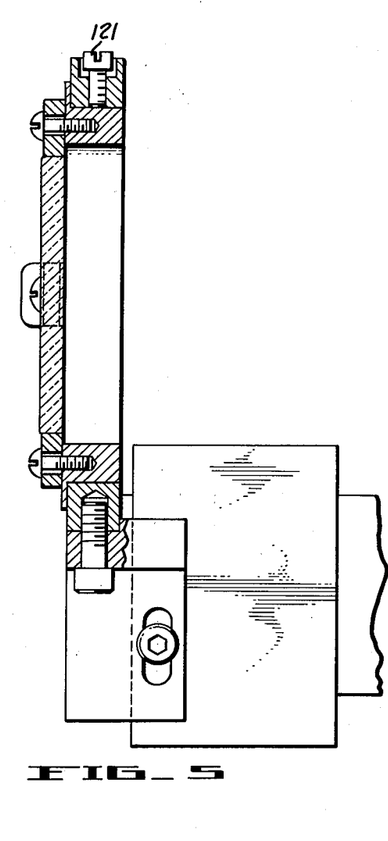
Figure 5 is a side elevational view of the cylindrical lens mount.
Figure 6A:
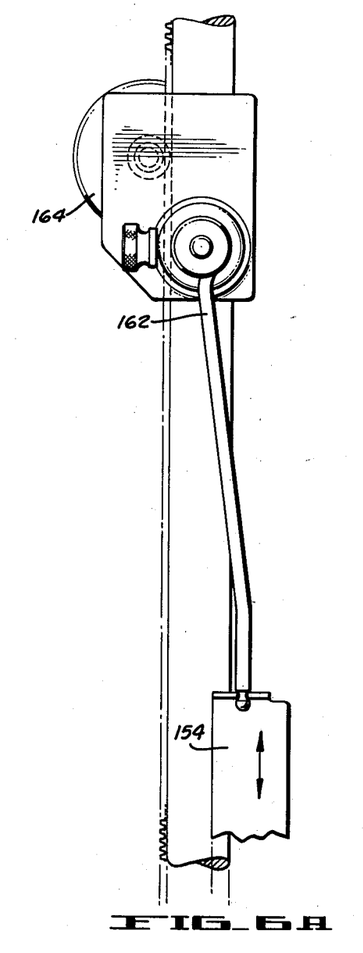
Figures 6A, 6B and 6C, when taken together, form a front elevational view of the "Gouy" mask assembly.
Figure 6B:
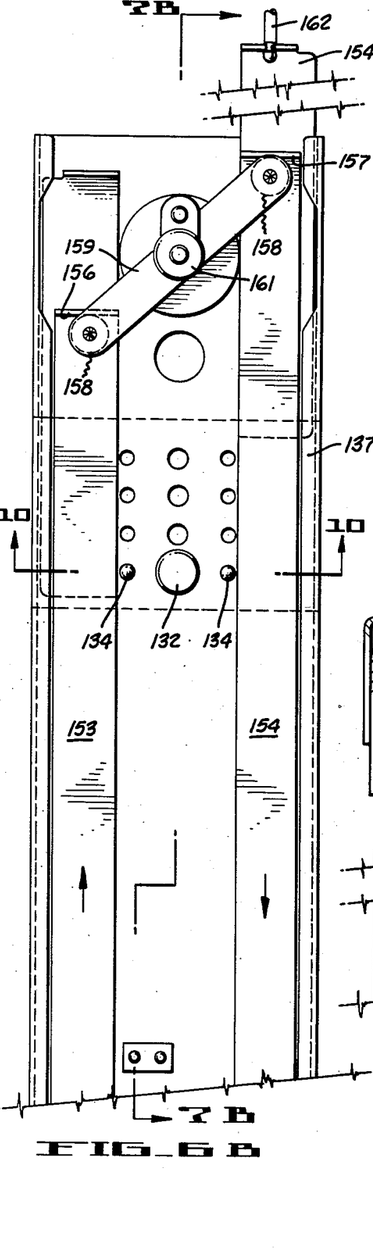
Figure 6C:
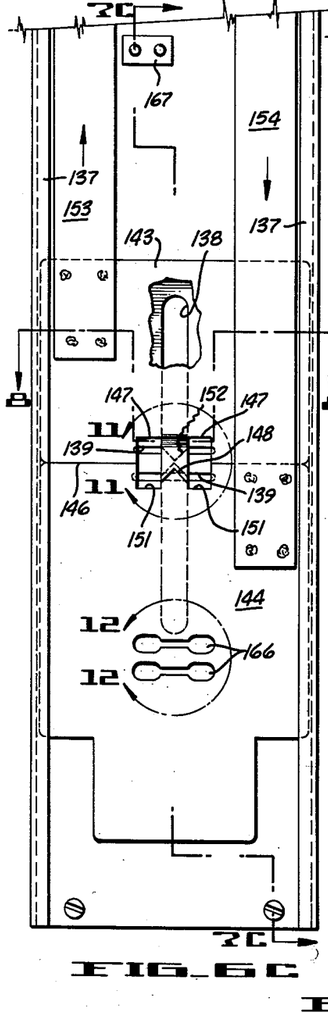

A preferred construction for the cylindrical lens mount is shown in Figures 4 and 5. The mount carries two adjustable stops 116 and 117, either of which may be brought against a pin 118 on the carriage ring 119. The lens is then locked in position by tightening the knurled screw 121. Thus it is possible to accurately locate the cylindrical axis in either one of two positions. When the cylindrical axis is in a vertical plane, it is used for imaging "Rayleigh" interference patterns at the plate and, in a horizontal plane, for imaging "Gouy" patterns at the plate. The cylindrical lens is not used when "Gouy" patterns are photographed at the analyzer (Schlieren diaphragm) plane.

The "Gouy" mask assembly 125, shown in Figure 2 near the window and illustrated in detail in Figures 6A, 6B, 6C, 7A, 7B, 7C, 8, 9 and 10, provides means for controlling the intensity of the undeviated slit image and accurately locating its center within a few microns. In addition, the apparatus provides for initially centering the mask at the boundary to be observed.

The "Gouy" mask assembly is mounted in the tank adjacent the bath window 88. A mounting member 126 is fixed to the tank, for example, by welding. The member 126 is adjustable by means of screw 127 which abuts against the tank liner. A clamping bracket 128 rides over the projection 129 of the mounting member 126. The other side of the projection 129 abuts against the reinforcing plate 131. The screw 132 passes through one of the holes 133 and engages the bracket 128. The bracket 128 is provided with two pins 134 (Figure 10) which interfit the holes 133. Thus the frame 136 is prevented from rotating about the screw 132. By loosening the screw 132 and passing it through another of the holes 133, the vertical position of the mask assembly may be varied. Thus it is possible to mount the mask assembly at various heights in the bath to thereby center the mask on boundaries formed at various levels in the cell limb.

Figure 7A:
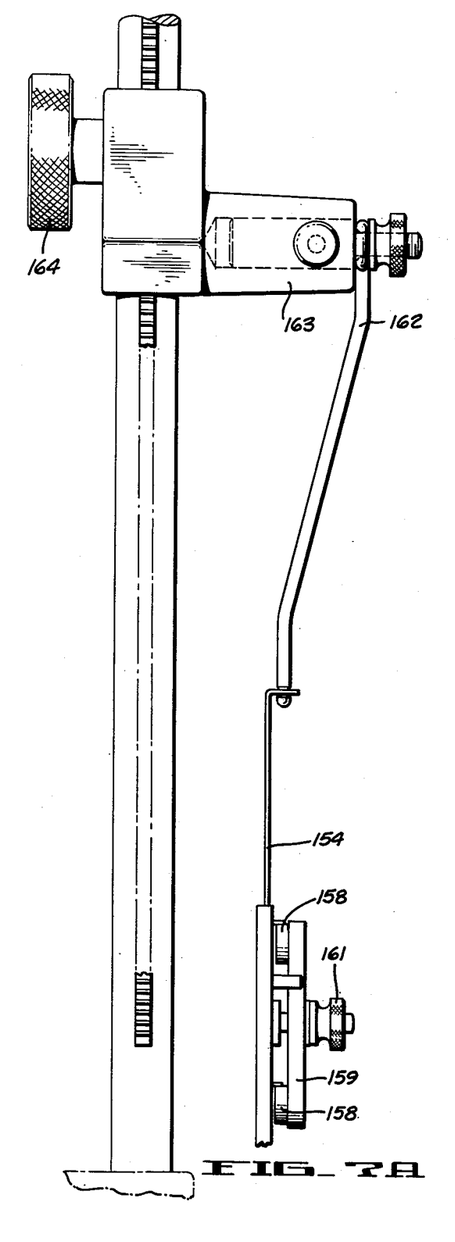
Figures 7A, 7B and 7C, when taken together, form a side elevational view partly in section of the "Gouy" mask assembly.
Figure 7B:
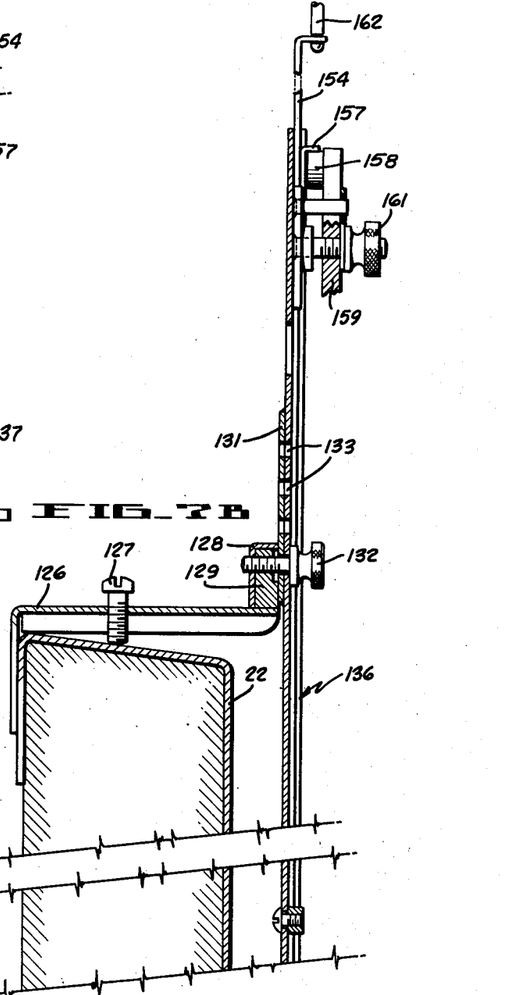
Figures 7C, 9, 10:
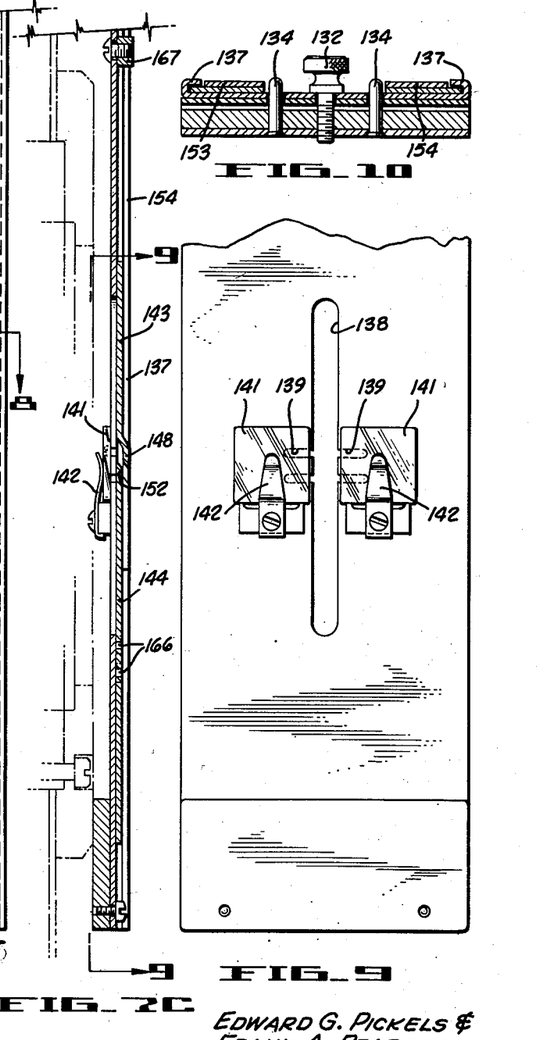
Figure 9 is a back elevational view of the "Gouy" mask assembly taken along the line 9—9 of Figure 7C.
Figure 10 is a sectional view taken along the line 10—10 of Figure 6B.
Figure 8:
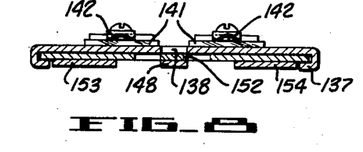
Figure 8 is a sectional view taken along the line 8—8 of Figure 6C.

The frame 136 is formed with two U-shaped guides 137 (Figures 8 and 10). A vertical slit 138 is cut in the frame 136. Horizontal slits 139 are provided on each side of the vertical slit 138. Rays from the reference channels pass through these slits. The spacing of the slits 139 is such that a desired fringe structure will be visible at the analyzer for calibrating the cell and measuring fractional fringes, as will be presently described. Immediately behind the horizontal slits 139, prisms 141 are held by the members 142 with their apexes toward the center of the mask. The prisms deflect the rays which pass through the reference channel so that they do not overlap the "Gouy" pattern obtained at the Schlieren diaphragm plane.

Figure 11:
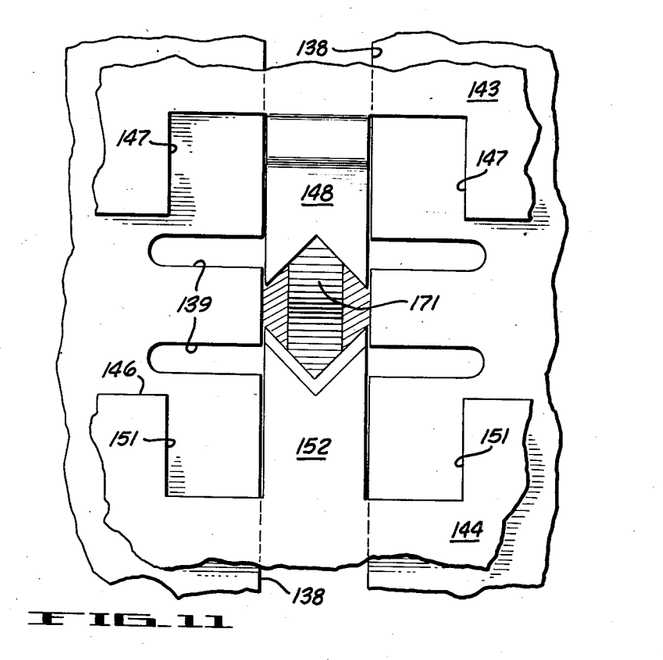
Figure 11 is an enlarged view of the portion 11—11 of Figure 6C together with a portion of the limb containing the boundary to be analyzed and the limb mask.

Upper shutter 143 and lower shutter 144 are adapted to ride in the U-shaped guides 137 and move equally in opposite directions. When the shutters are closed, the end portions meet at 146. The upper shutter 143 is cut out at 147 to leave the horizontal slits 139 exposed when the shutters are closed. The end mask 148 which has its end formed in a V-shape and beveled to provide a knife edge rides over the vertical slit 138. The shutter 144 is likewise provided with a portion 151 and an end mask 152. The end mask 148 is bent to ride over the end mask 152 as shown in Figure 7C. The bilateral end masks 148 and 152 are V-shaped to give rise to diffraction patterns which are easily distinguished from the "Gouy" pattern. The particular shape of the end portion of the end mask is not important as long as they are shaped in such a manner that the diffraction pattern they set up may be distinguished from the "Gouy" pattern. As the two shutters 143 and 144 are moved apart, the end masks 148 and 152 move to provide an opening. The end masks provide a means for reducing the intensity of the undeviated slit image. In Figure 11, I have shown an enlarged view of the portion of the limb containing the refractive index gradient and the adjacent mask assembly.

Tab 153 is attached to the shutter 143, while tab 154 is attached to the shutter 144. The tabs are provided with projections 156 and 157 which engage the rollers 158 on the opposite sides of the lever 159. Thus, as the tab 154 is moved in a downward direction, the lever 159 rotates and forces against the projection 156 to thereby lift the tab 153. Thus the movement of the shutter 144 in a downward direction is exactly equal to the movement of the shutter 143 in an upward direction. The lever 159 may be clamped in position by tightening the knurled screw 161.

The upper end of the tab 154 engages the link 162. The other end of the link 162 is attached to the member 163 which is moved by means of a rack and pinion assembly. Thus, by turning the knob 164, tab 154 may be accurately positioned.

The lower shutter 144 is provided with dumbbell-shaped slits 166. By lifting the tab 154, the shutters 143 and 144 are brought together and then lifted until the shutter 143 abuts the abutment 167. The screws holding the abutment 167 are fitted in elongated holes which provide for a slight adjustment of its position. When the shutter 143 strikes the abutment 167, the narrow portion of the dumbbell-shaped slit 166 is aligned with the horizontal slits 139 to form a continuous slit, shown in enlarged detail in Figure 12. As will be presently described, this provides means for calibrating the cell and measuring fractional fringes.

Figure 13:
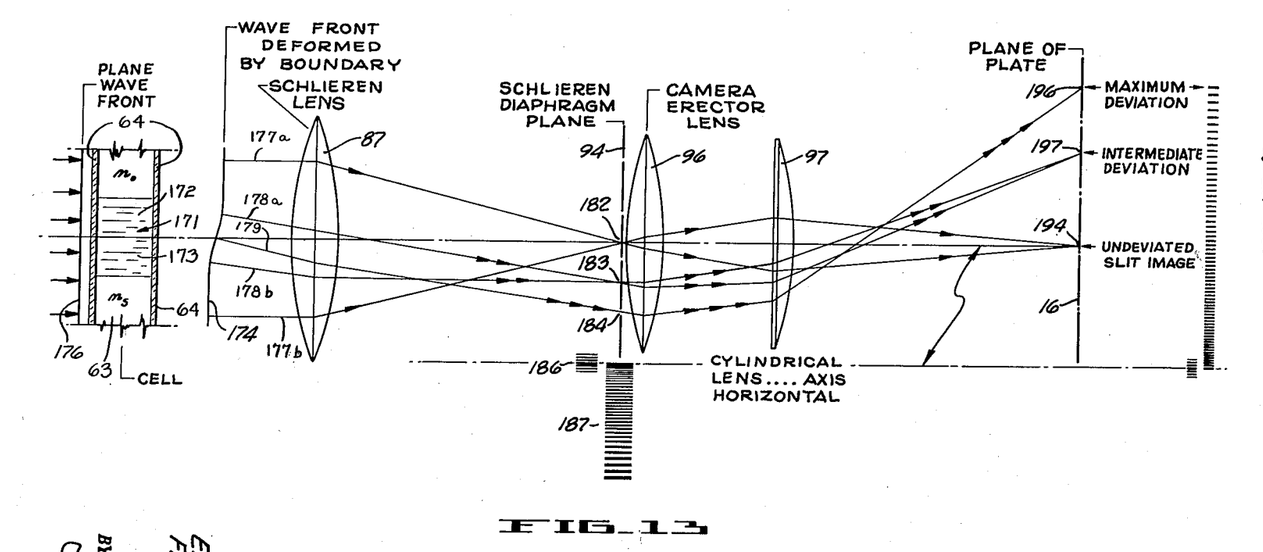
Figure 13 shows a portion of the limb containing the boundary to be analyzed and a ray diagram, together with "Gouy" fringe patterns and reference patterns obtained at the Schlieren diaphragm plane and at the holder.

Operation of the mask and the cylindrical lens may be more clearly understood with reference to Figure 13 where the "Gouy" patterns obtained at the Schlieren diaphragm plane 94 and at the plate holder 16 are shown. The limb 63 is shown with a solution having an index of refraction gradient 171. For example, the solution contained in the upper portion 172 may have a lower index of refraction than the solution contained in the lower portion 173. The variations of the index of refraction with height in the cell are shown generally by the curve 174. A plain wave front 176 is shown approaching the cell 63. Due to the variation in index of refraction of the solution in the portions 172 and 173, the wave front will be delayed a greater amount by the solution contained in the lower portion of the limb. Thus the wave front leaving the cell will be of the type shown by the curve 174 which, as previously described, represents generally the variation in index of refraction. The rays 177a, 177b, 178a, 178b, and 179 are shown drawn normal to the new wave front. The rays 177a, and 177b pass through a region where the index of refraction does not vary. After passing through the Schlieren lens 87, these rays are brought to focus at the analyzer or Schlieren diaphragm plane 94, as shown at 182. The fringe 182 shows the undeviated slit image. It is seen that the undeviated slit image will be brightly illuminated and that the photographic film employed will be greatly overexposed. The end masks are employed to control the amount of light reaching this portion of the film. Thus, by moving the shutters the end masks 148 and 152 are brought together to decrease the illumination (see particularly Figure 11). The rays 178a and 178b pass through regions having equal refractive index gradients, and are deviated equally and thus focus at 183. Similarly, ray 179 is brought to focus at 184. The interference pattern 186 formed by the horizontal reference slits is deflected by the prisms and appears adjacent the "Gouy" pattern 187.

Figure 12:
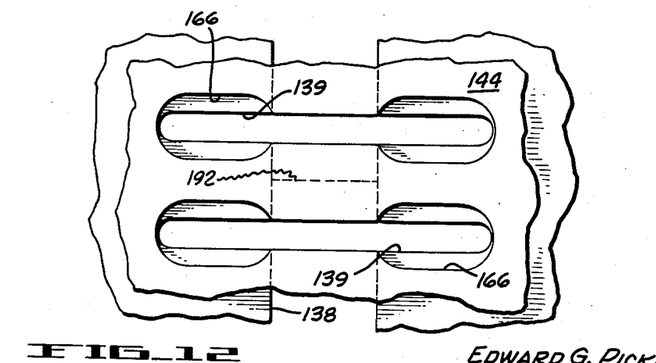
Figure 12 is an enlarged view of the portion 12—12 of Figure 6C, together with a portion of the limb containing the boundary to be analyzed.
Figure 14:
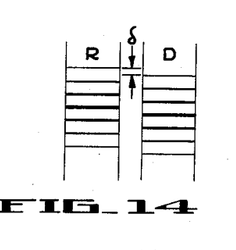
Figures 14 and 15 show fringe patterns obtained when calibrating a cell and measuring the fractional fringe.
Figure 15:
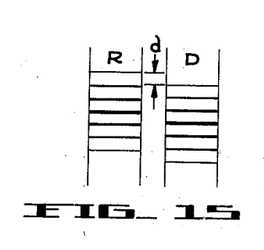

Since the optical surface of the cells employed may not be perfect and may not be parallel, it is necessary to calibrate each cell. This is done by filling the cell with solution which has the same index of refraction as the bath and lifting the shutters 143 and 144 until a continuous slit, as shown in Figure 12, is formed. Referring to Figure 14, the pattern D represents the diffraction pattern obtained through the cell. The pattern R represents the pattern obtained through the reference channel. The displacement δ represents the error introduced by the cell. A sharp boundary 192 (Figure 12) is now formed in the cell midway between the two reference slits and another pattern is recorded. Referring particularly to Figure 15, a representative pattern is shown. Displacement is now represented by the distance $d$. The difference between the two displacements $(d-δ)$ is a measure of the displacement introduced by having two solutions present. The fractional fringe displacement is, therefore, given by $$\frac{(d-δ)}{f}$$

where $f$=fringe spacing.

The "Gouy" pattern as shown in Figure 13 is obtained at a suitable interval after the start of diffusion. Total fringes are counted and the fractional fringe added.

It is convenient to reimage the "Gouy" pattern at the plate rather than obtaining the pattern a the Schlieren diaphragm plane. This is achieved by rotating the cylindrical lens 97 so that its axis is horizontal. The pattern obtained at the plate will then have a magnification in the direction of fringe travel (as diffusion progresses) while the magnification in the horizontal direction (normal to the above) is essentially unity. This provides a convenient means for observing the competency of the boundary. The fringe pattern obtained will depict the contour of the boundary. As is well known to those familier in the art, it is necessary that the boundary layers of uniform concentration be horizontal for valid results.

Operation of the cylindrical lens and the associated optical system are shown in Figure 13. The rays from the Schlieren diaphragm plane 94 pass through the camera erector lens 96 and then through the cylindrical lens 97. These rays are brought to a focus at the plane of the plate 16. The undeviated slit image appears at 194 and the ray undergoing maximum deviation at 196, while intermediate deflected rays lie in the region between 194 and 196, as, for example, at 197. There is magnification along the vertical axis, while the magnification in the horizontal direction is unity.

Thus it is seen that apparatus is provided which is adaptable to observe and photograph refractive index variations and refractive index gradients by different methods. When photographing "Guoy" fringe patterns, means are provided for accurately calibrating the cell and for measuring fractional fringes. A novel optical system which includes a lens provides means for relaying this "Gouy" pattern to the plane of the plate, where an astigmatic image is formed in that the magnification along the direction of fringe travel may be any small value, while magnification in a horizontal direction is essentially unity. This unique feature enhances the ease of measuring fringe displacement while furnishing information about the competency of the boundary, through the punctual correspondance in a horizontal direction, between boundary and image.

We claim:

1. In apparatus for analyzing refractive index variations and refractive index gradients in solutions contained in a cell, means for projecting a light beam, a slit disposed to intercept said beam and serving to form an illuminated slit source of light, the light rays from said source being projected through the cell and solution, an optical system serving to produce a pattern of interference fringes including an undeviated slit image, and a mask assembly interposed between the slit source and the cell and including a first pair of spaced horizontal slits serving to form a reference pattern of interference fringes, a prism located adjacent said slits for deviating the axis of said reference interference pattern to image the same adjacent said pattern of interference fringes, second spaced horizontal slits adapted to be aligned with said first spaced horizontal slits and providing means for calibrating the equipment for a particular cell, and a pair of movable shutters serving to reduce the intensity of the undeviated slit image.

2. Apparatus as in claim 1 wherein said second spaced horizontal slits are formed on one of said movable shutters.

3. In apparatus for analyzing refractive index variations and refractive index gradients in solutions contained in a transparent limb having a reference channel, an optical system which includes a light source, means associated with said light source for projecting a light beam, a slit serving to intercept said light beam and forming an illuminated slit source, lens means for collimating the light rays from said source prior to passing through the transparent limb, a mirror disposed adjacent said limb for reflecting said beam back through the limb and lens means, optical means for forming a pattern of interference fringes including an undeviated slit image, and masking means disposed between said lens and said limb including movable shutters for reducing the intensity of the undeviated slit image, means including horizontal spaced slits disposed adjacent said reference channel for producing a reference pattern of interference fringes, a prism located adjacent said slits for deflecting the axis of said reference interference pattern to image the pattern adjacent said pattern of interference fringes, and second horizontal spaced slits adapted to be aligned with said first slits and providing means for forming an interference fringe pattern for calibrating the equipment for a particular limb and measuring fractional fringes.

4. In apparatus for analyzing refractive index variations and refractive index gradients in solutions contained in a transparent limb having a reference channel, an optical system which includes a light source, means associated with said light source for projecting a light beam, slit means disposed to intercept said light beam and serving to form an illuminated slit source, lens means for collimating the light rays from the slit source prior to their passing through the transparent limb, a mirror disposed adjacent said limb for reflecting the said beam back through the limb and lens, analyzing means including optical means for forming a pattern of interference fringes including an undeviated slit image having substantially unit magnification in one direction to provide point-to-point correspondence between the solution and the fringe pattern in said direction, and masking means disposed between said lens and said limb and including horizontally spaced slits disposed adjacent said reference channel for producing a reference pattern of interference fringes, a prism located adjacent said slits for deflecting the axis of said reference interference pattern to image the pattern adjacent said pattern of interference fringes, second horizontal spaced slits adapted to be aligned with said first spaced slits and forming an interference pattern for calibrating the equipment for a particular transparent limb and measuring fractional fringes, and movable shutters for varying the intensity of the undeviated slit image.

5. In apparatus for analyzing refractive index variations and refractive index gradients in solutions contained in a transparent limb having a reference channel, an optical system which includes a light source, means associated with said light source for forming an illuminated slit source, lens means for collimating the light rays from said source prior to their passing through the transparent limb, a mirror disposed adjacent said limb for reflecting said beam back through the limb and lens means, optical means for forming a pattern of interference fringes including an undeviated slit image, and lens means serving to receive said pattern and to form a second pattern having substantially unit magnification in one direction to provide point-to-point correspondence between the solution and the fringe pattern in one direction and serving to magnify the pattern in the other direction, and masking means disposed between said collimating lens and said limb and including movable shutters for reducing the intensity of the undeviated slit image, spaced horizontal slits for forming a reference pattern of interference fringes, and second spaced horizontal slits carried by one of said movable shutters and adapted to be aligned with said first slits for calibrating the equipment for a particular cell.

6. In apparatus for analyzing refractive index variations and refractive index gradients in solutions contained in a cell, means for projecting a light beam, a slit disposed to intercept said beam and serving to form an illuminated slit source of light, the light rays from said source being projected through the cell and solution, an optical system serving to produce a pattern of interference fringes including an undeviated slit image, a mask assembly interposed between the slit source and the cell and including means for forming a reference pattern of interference fringes adjacent said pattern of interference fringes, means for calibrating the equipment to a particular cell, and movable shutters adapted to be continuously moved to follow and mask the undeviated portion of the light beam for reducing the intensity of the undeviated slit image.

7. In apparatus for analyzing refractive index variations and refractive index gradients in solutions contained in a transparent limb having a reference channel, an optical system which includes a light source, means associated with said light source for projecting a light beam, a slit serving to intercept said light beam forming an illuminated slit source, lens means for collimating the light rays from said source prior to passing through the transparent limb, a mirror disposed adjacent said limb for reflecting said beam back through the limb and lens means, optical means for forming a pattern of interference fringes including an undeviated slit image, and masking means disposed between said lens and said limb and including movable shutters adapted to be continuously moved to follow and mask the undeviated portion of the light beam for reducing the intensity of the undeviated slit image.

8. In apparatus for analyzing refractive index variations and refractive index gradients in a solution contained in a cell, means for projecting a light beam, a slit disposed to intercept said beam and to form a narrow illuminated slit source, the light rays from said source being projected through said cell and solution, an optical system serving to produce a pattern of interference fringes including an undeviated slit image, a mask assembly disposed between said source and said cell including spaced horizontal slits serving to form a reference pattern of interference fringes for calibrating the equipment for a particular cell and measuring fractional fringes, and movable shutters adapted to be continuously moved to follow and mask the undeviated portion of the light beam for varying the intensity of the undeviated slit image.

References Cited in the file of this patent

Longsworth: "Experimental Test of an Interference Method for the Study of Diffusion," American Chemical Society Journal, volume 69, pages 2510–2516, August–December 1947.

Longsworth: "Improved Electrophoresis Apparatus for Small Volumes," Analytical Chemistry, volume 25, No. 7, pages 1074–1078, July 1953.